United States Patent
Sankara et al.

(10) Patent No.: US 10,526,986 B2
(45) Date of Patent: Jan. 7, 2020

(54) SYSTEMS AND METHODS FOR CONTROLLING EGR FLOW RATE

(71) Applicant: Progress Rail Locomotive Inc., LaGrange, IL (US)

(72) Inventors: Reddy P. S. Sankara, Naperville, IL (US); Steven D. Johnson, Naperville, IL (US); Liangtao Zhu, San Antonio, TX (US); Michael B. Goetzke, Orlando Park, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 38 days.

(21) Appl. No.: 15/991,231

(22) Filed: May 29, 2018

(65) Prior Publication Data

US 2019/0368436 A1     Dec. 5, 2019

(51) Int. Cl.
| | | |
|---|---|---|
| *F02D 41/00* | (2006.01) | |
| *F02D 41/14* | (2006.01) | |
| *F02M 26/47* | (2016.01) | |
| *F02D 41/26* | (2006.01) | |

(52) U.S. Cl.
CPC ..... *F02D 41/0077* (2013.01); *F02D 41/0047* (2013.01); *F02D 41/0072* (2013.01); *F02D 41/1461* (2013.01); *F02D 41/26* (2013.01); *F02M 26/47* (2016.02); *F02D 2041/0075* (2013.01); *F02D 2250/36* (2013.01)

(58) Field of Classification Search
CPC ............ F02D 41/0077; F02D 41/0047; F02D 41/005; F02D 2041/0072; F02D 41/0057; F02D 41/0062; F02D 41/0065; F02D 41/146; F02D 41/1461; F02D 2250/36; F02M 26/47
See application file for complete search history.

(56) References Cited

U.S. PATENT DOCUMENTS

| | | | |
|---|---|---|---|
| 9,528,455 B2 | 12/2016 | Hanamura et al. | |
| 9,593,632 B2 | 3/2017 | Ge | |
| 2006/0235603 A1* | 10/2006 | Kobayashi | F02D 41/0072 701/108 |
| 2016/0131057 A1 | 5/2016 | Lahti et al. | |
| 2016/0217716 A1 | 7/2016 | Yamamoto | |
| 2016/0369723 A1 | 12/2016 | Deb et al. | |
| 2017/0284282 A1* | 10/2017 | Ochi | F02D 41/0057 |

* cited by examiner

*Primary Examiner* — Jacob M Amick
(74) *Attorney, Agent, or Firm* — Bookoff McAndrews

(57) ABSTRACT

According to one aspect of the present disclosure, a method of controlling an exhaust gas recirculation (EGR) system of an engine system includes determining a first EGR command according to a first method during a steady state engine condition, determining a second EGR command according to a second method during a transient engine condition, wherein the first method is based at least in part on values from a NOx sensor, and the second method is not based on values from a NOx sensor. The method further includes adjusting an EGR valve of the EGR system based on the first EGR command during the steady state engine condition, and adjusting the EGR valve based on the second EGR command during the transient engine condition.

20 Claims, 3 Drawing Sheets

SYSTEMS AND METHODS FOR CONTROLLING EGR FLOW RATE

TECHNICAL FIELD

The present disclosure relates generally to internal combustion engine systems. More specifically, this disclosure relates to systems and methods for controlling exhaust gas recirculation systems of internal combustion engine systems.

BACKGROUND

Internal combustion engine systems may emit certain undesirable air pollutants and particulates as a byproduct of the combustion process. For example, internal combustion engines may produce nitrous oxides (NOx) when combustion within the engine cylinders reaches elevated temperatures. In an effort to control these emissions, engine manufactures have implemented various pollutant-reducing features, such as exhaust gas recirculation (EGR) systems.

An EGR system recirculates a portion of the engine exhaust gas back into the intake side of the engine for combustion with fresh air. By reintroducing the exhaust gas, the EGR system lowers the peak temperatures within the cylinders during combustion, thereby reducing the formation of NOx. However, the amount of NOx emitted may vary based on the flow rate of exhaust in the EGR system (the "EGR flow rate"), among other factors.

As operating parameters of the engine change, the operating parameters of the EGR system must adjust in order to accommodate for varying levels of NOx emissions. Some engine systems adjust for this variability in NOx emissions by controlling the EGR system based only on a calculation of the EGR flow rate. Other engine systems may adjust the EGR system based only on measurements from an NOx sensor. However, each of these EGR adjustment approaches may have limitations over the entire range of engine operation.

One exemplary method of controlling an EGR system can be found in U.S. Patent Application Publication No. 2016/0369723 published to Deb et al. on Dec. 22, 2016 ("the '723 publication"), which discloses a system that regulates exhaust gas recirculation flow rate in an engine to limit NOx emissions. While the method of controlling an EGR system described in the '723 publication may be useful in some applications, it may not provide sufficient control of NOx emissions over the full range of engine operating conditions.

The engine system of the present disclosure may solve one or more of the problems set forth above and/or other problems in the art. The current scope of the disclosure, however, is defined by the attached claims, and not by the ability to solve any specific problem.

SUMMARY OF THE DISCLOSURE

According to one aspect of the present disclosure, a method of controlling an exhaust gas recirculation (EGR) system of an engine system includes determining a first EGR command according to a first method during a steady state engine condition, determining a second EGR command according to a second method during a transient engine condition, wherein the first method is based at least in part on values from a NOx sensor, and the second method is not based on values from a NOx sensor. The method further includes adjusting an EGR valve of the EGR system based on the first EGR command during the steady state engine condition, and adjusting the EGR valve based on the second EGR command during the transient engine condition.

According to another aspect of the present disclosure, a method of controlling an exhaust gas recirculation (EGR) system of an engine system includes determining an EGR command based at least in part on a comparison of a value representing an actual EGR mass flow rate and a value representing a desired EGR mass flow rate, wherein the value representing the desired EGR flow rate is determined according to a first method during a steady state engine condition, and determined according to a second, different method during a transient engine condition. The first method is based at least in part on values from a NOx sensor, and the second method is not based on values from a NOx sensor.

According to yet another aspect of the present disclosure, an exhaust gas recirculation (EGR) system of an engine system includes a first module configured to determine determining a value representing an actual EGR mass flow rate, and a second module configured to determine a value representing a desired EGR mass flow rate. The system further includes at least one EGR valve controlled by the values from the first and second modules, wherein input to the second module is based on a value from an adjustment factor module during a steady state engine condition, and wherein input to the second module is not based on a value from the adjustment factor module during a transient engine condition.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The current disclosure will be described with reference to a diesel compression ignition engine system 10, however this is only exemplary. In general, the current disclosure can be applied to other types of internal combustion engine systems, including but not limited to a gaseous-fuel-powered (i.e., natural gas) engine, a biodiesel engine, a gasoline engine, or any other internal combustion engine system known in the art. In this disclosure, relative terms, such as, for example, "approximately," "generally," and/or "about" are used to indicate a possible variation of ±10% in the stated value or parameter.

Figure 1:
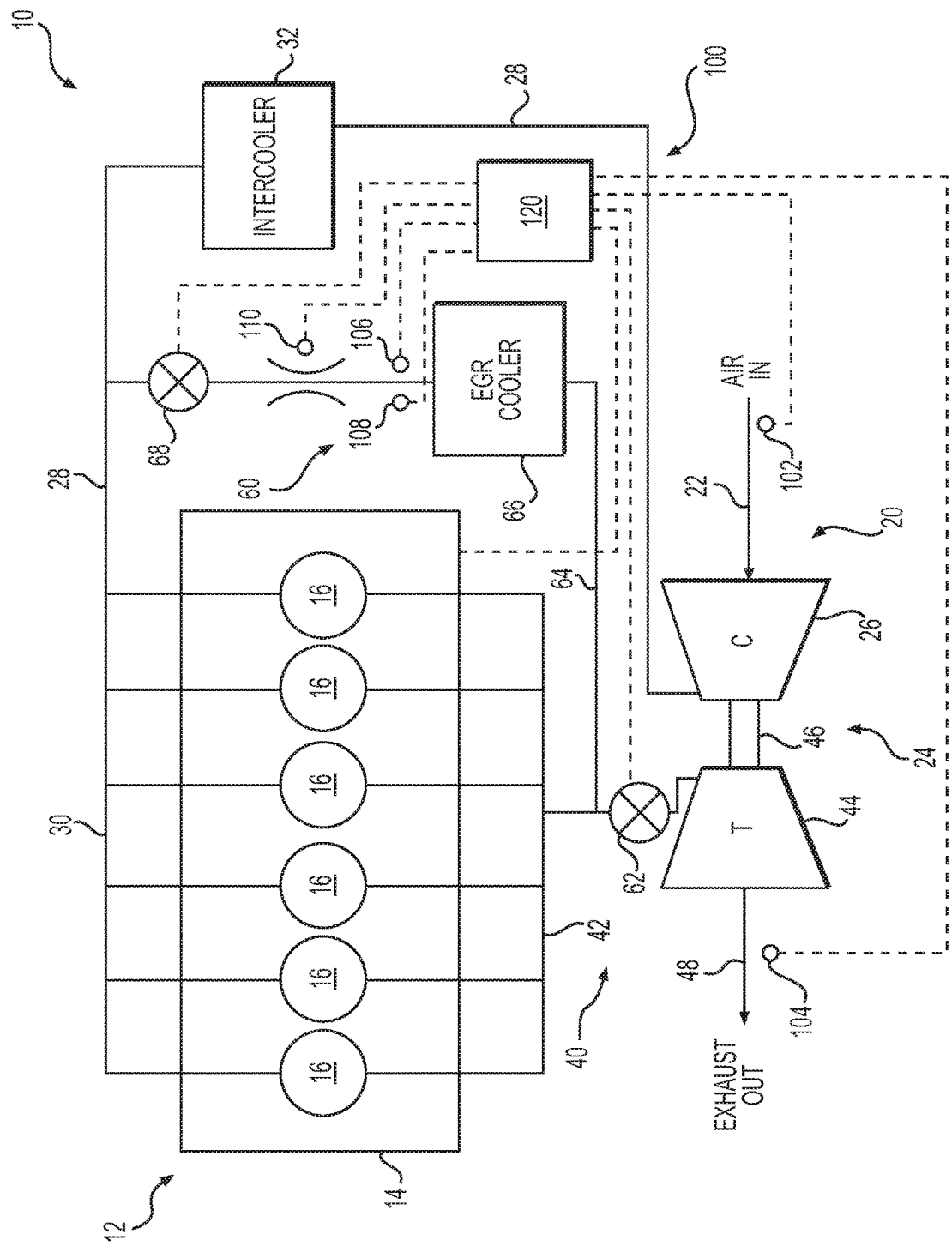
FIG. 1 is a schematic illustration of an exemplary engine system.

FIG. 1 illustrates an exemplary internal combustion engine system 10 used to power a machine (not shown). The machine may be a stationary industrial machine or a mobile machine such as, e.g., a locomotive, car, truck, ship, ground engaging machine, or other mobile machine known in the art powered by an internal combustion engine. Engine system 10 includes an engine 12 that may include, among other things, an engine block 14 and a plurality of combustion cylinders 16. In the illustrated embodiment, the engine cylinders 16 are schematically shown arranged in an inline configuration. However, this is exemplary only, and it is contemplated that cylinders 16 may be arranged in a V-configuration, in an opposing configuration, or in another known configuration. Engine system 10 may also include one or more fuel injectors, fuel rails or other fueling components (not shown) to provide fuel to engine 12. Fuel may be introduced into engine system 10 upstream of cylinders 16, and/or directly into cylinders 16.

The engine system 10 may also include one or more subsystems and/or components, such as, for example, an air induction system 20, an exhaust system 40, an exhaust gas recirculation (EGR) system 60, and a control system 100. Air induction system 20 may be configured to direct air into the engine 12 for combustion. Exhaust system 40 may be configured to direct byproducts of combustion into an aftertreatment system (not shown) and/or EGR system 60. EGR system 60 may be configured to recirculate the byproducts of combustion, (i.e., engine exhaust), back into the engine 12. Control system 100 may monitor and control at least part of the performance of engine system 10, as will be described in more detail below.

Air induction system 20 may include an intake line 22 through which engine 12 receives air. Intake line 22 may be fluidly connected to a compressor 26 of a turbocharger 24. Compressor 26 is mechanically coupled with a turbine 44, e.g., via a shaft 46, so that rotation of turbine 44 drives/rotates compressor 26. Turbine 44 may be configured to receive engine exhaust gas to drive turbine 44, and then direct the exhaust gas to the aftertreatment system (not shown). Compressor 26 may be configured to compress air and direct the compressed air through an intake line 28 to an intake manifold 30 of engine 12. As shown in FIG. 1, air induction system 20 may include one or more intercoolers, e.g., intercooler 32, disposed in intake line 28 between compressor 26 and intake manifold 30.

Exhaust system 40 may include, among other things, an exhaust manifold 42 to direct the byproducts of combustion, e.g., exhaust gas, away from the cylinders 16. Exhaust manifold 42 may be coupled to engine block 14, and be fluidly connected to engine cylinders 16. Exhaust manifold 42 may direct exhaust gas exiting cylinders 16 toward turbine 44. As described above, turbine 44 may receive exhaust gas to rotate turbine 44, and then turbine 44 may route exhaust gas through an exhaust line 48 and into an aftertreatment system.

EGR system 60 may include an EGR line 64 having an upstream end connected to or adjacent the exhaust manifold 42, and upstream turbine 44. EGR line 64 may include a downstream end connected to the intake line 28 or intake manifold 30. An EGR valve 62 may be located at or adjacent the upstream end. An EGR cooler 66 may be located downstream EGR valve 62. A plurality of sensors, for example an absolute pressure sensor 106, temperature sensor 108, and EGR flow rate sensor 110 may be included in EGR line 64 to measure the characteristics of exhaust gas flowing through EGR line 64. Another EGR valve 68 may be included at the downstream end of EGR line 64. EGR valves 62 and 68, EGR cooler 66, and sensors 106, 108, 110 of EGR system 60 may be of any conventional design, as is known in the art. For example, EGR valves 62 and 68 may be solenoid-operated valves, e.g. butterfly-type valves, or any other controlled EGR valve known in the art. EGR valves 62 and 68 may be capable of modulation between a fully open and fully closed condition in response to an ERG command signal (126, FIG. 2) from controller 100 corresponding to a desired amount of EGR flow through EGR line 64.

Engine system 10 may further include an absolute humidity sensor 102 located in air induction system 20, e.g., at a location adjacent or upstream of an inlet of compressor 26. Alternatively, absolute humidity sensor 102 may be disposed at another location that allows absolute humidity sensor 102 to measure an ambient humidity of the atmospheric engine intake air. Absolute humidity sensor 102 may be of any conventional design to generate signals indicative of the absolute humidity of the atmospheric engine intake air.

Engine system 10 may also include a NOx sensor 104 located downstream turbine 44 in exhaust line 48 and upstream of the aftertreatment system. NOx sensor 104 may be of any conventional design to generate signals indicative of the amount of NOx emitted by the engine system 10.

Control system 100 may include a controller 120 for controlling various features of engine system 10. Controller 120 may be in any conventional form and may include, for example, one or more microprocessors, memory, software, and firmware for executing various functions that will be described in connection with FIGS. 2 and 3 below. As shown in FIG. 1, controller 120 may be coupled to send and receive signals from various components of engine system 10, including, for example, engine 12, EGR valves 62, 68, absolute pressure sensor 106, temperature sensor 108, flow rate sensor 110, humidity sensor 102, and NOx sensor 104. Controller 120 may also be connected to send and receive signals from other engine or machine components to determine conventional operating parameters, such as, for example, engine brake horsepower, engine speed, fuel rate (as a function of volume and stroke of engine system 10), or other operating parameters.

Figure 2:
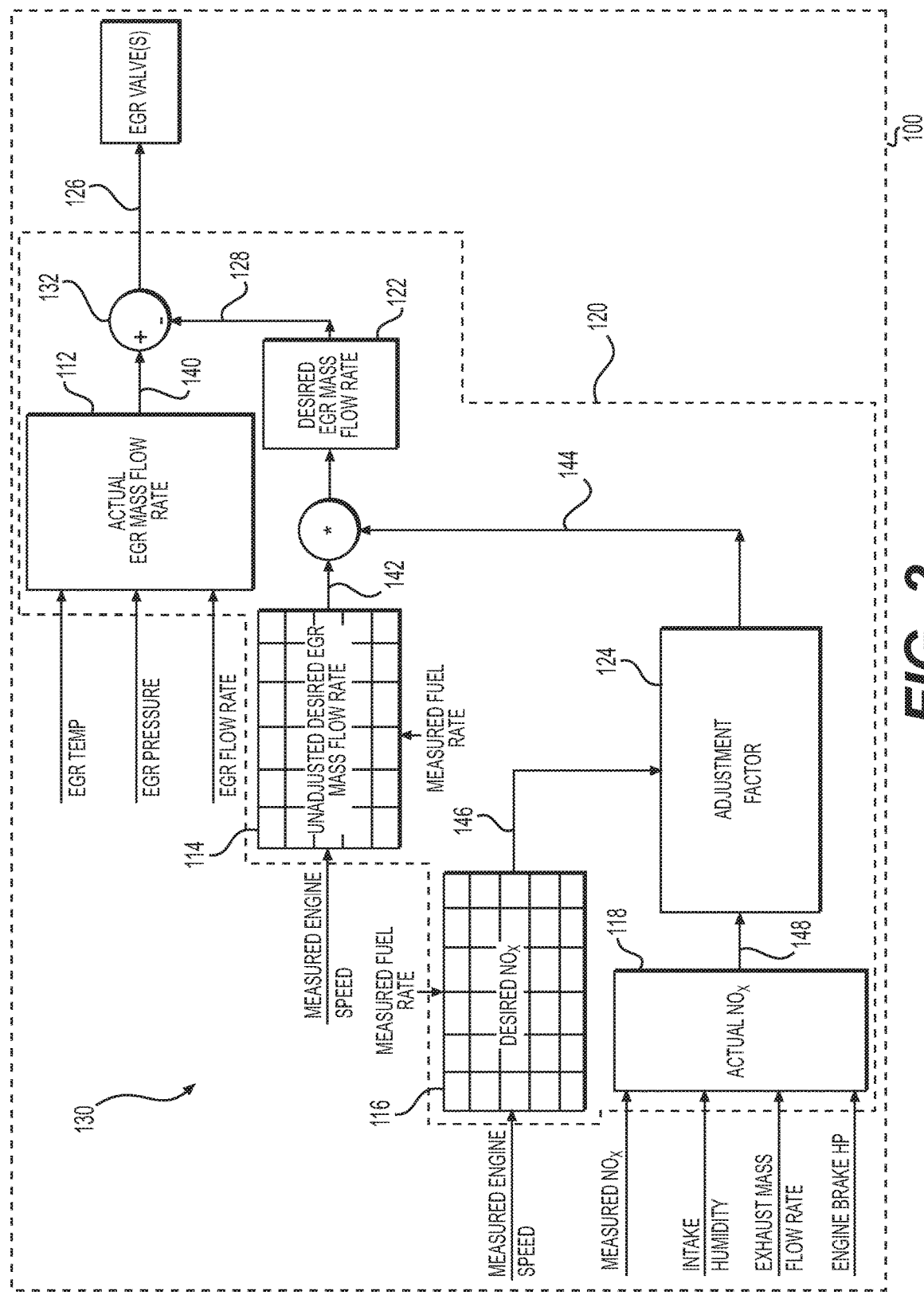
FIG. 2 is a block diagram illustration of an exemplary control strategy for generating an EGR command signal in the engine system of FIG. 1.

Referring to FIG. 2, control system 100 may include a control strategy 130 for controlling the flow of exhaust through EGR line 64. Control strategy 130 may include a series of subroutines or modules for determining EGR command signals 126 that control the modulation of EGR valves 62, 68. For example, controller 120 may include an actual EGR mass flow rate module 112, an unadjusted desired EGR mass flow rate module 114, a desired NOx module 116, an actual NOx module 118, an adjustment factor module 124, and a desired EGR mass flow rate module 122. The values from the actual EGR mass flow rate module 112 and desired EGR mass flow rate module 122 are compared at 132 to determine the EGR command signals 126.

Referring now to each of the modules, the actual EGR mass flow rate module 112 may use signals from EGR temperature sensor 108, EGR pressure sensor 106, and EGR flow rate sensor 110 in a conventional function to determine an actual EGR mass flow rate value 140. The desired EGR mass flow rate module 122 may use an unadjusted desired EGR mass flow rate value 142 from unadjusted desired EGR mass flow rate module 114, modified (multiplied) by an adjustment factor 144 from adjustment factor module 124. The desired EGR mass flow rate module 122 may use these valves in a conventional function to output a desired EGR mass flow rate value 128. As will be discussed in more detail below, the adjustment factor 144 may be based on a comparison of a desired NOx value 146 and an actual NOx value 148. In particular, the desired NOx module 116 may determine the desired NOx value 146 through the use of a map or look-up table based on values for measured fuel rate and measured engine speed. Actual NOx module 118 may determine the actual NOx value 148 through the use of a map or look-up table based on values from NOx sensor 104, humidity sensor 102, and values for exhaust mass flow rate, and engine brake horsepower.

Unadjusted desired EGR mass flow rate module 114 may determine an unadjusted desired EGR mass flow rate value 142 in any conventional manner and be based on engine operation parameters or other measured information, such as, e.g., a measured fuel rate and a measured engine speed. Module 114 may include a map or look-up table of desired EGR mass flow rates from which module 114 may determine the unadjusted desired EGR mass flow rate value 142.

Similarly, module 116 may determine the desired NOx value based on engine operation parameters, such as, e.g., values for engine speed, and fuel rate. Module 116 may include a map or look-up table of desired NOx values corresponding to at least one of engine speed or fuel rate.

As noted above, adjustment factor module 124 may determine the adjustment factor 144 based on the desired NOx value determined by module 116 and the actual NOx value determined by module 118. Module 124 may determine the adjustment factor by dividing the desired NOx value by the actual NOx value. The adjustment factor may represent an adjustment to the desired EGR mass flow rate from module 114. The adjustment factor may compensate for varying engine system operating conditions, through multiplication of the adjustment factor 144 and the unadjusted desired EGR mass flow rate value 142.

Controller 100 may also monitor performance characteristics of engine system 10 to determine whether engine system 10 is operating in a steady state or in a transient condition, e.g. by information received at or stored in the memory of controller 100. A steady state engine condition may be defined as the engine system 10 operating such that a rate of change in engine speed is below a predetermined limit and/or a rate of change in engine fuel delivered is below a predetermined limit. When the rate of change in engine speed and/or fuel delivery is greater than predetermined valves, the engine is operating in a "transient condition." In one example, if it is determined that the engine system 10 has a rate of change in engine speed of less than 10 rpm/second, then the engine system 10 is in a steady state condition, and if the rate of change is greater than 10 rpm/second, the engine is in a transient condition. Note, however, that this value of 10 rpm/second is exemplary only, and that other values for distinguishing a steady state engine condition from a transient engine condition may be used.

INDUSTRIAL APPLICABILITY

The systems and methods disclosed herein may be applied in any internal combustion engine system to control the mass flow rate of exhaust gas recirculated within an engine system to minimize variability in NOx emissions. In an exemplary embodiment, a method for controlling EGR of an engine system 10 according to the present disclosure may be implemented in a locomotive to adjust the mass flow rate of exhaust in an EGR system in response to changing engine conditions. The method and system disclosed herein may assist the engine system in controlling the amount of NOx emitted by the engine system so that NOx emissions stay within a desired range while the engine system operates efficiently.

An exemplary method of controlling engine system 10 will now be described in connection with FIG. 3. At step 200, engine 12 is turned on. When engine 12 starts, EGR valve 62 is fully open to turbine 44, and EGR valve 68 is fully closed. Air is received through intake line 22 into compressor 26, and compressed. The compressed air flows from compressor 26 through intake line 28, intercooler 32, intake manifold 30, and into engine cylinders 16. Fuel is introduced into engine cylinders 16 to produce an air-fuel mixture within the plurality of cylinders 16. The air-fuel mixture is pressurized within the cylinders 16 and then ignited (via compression ignition) to combust and produce exhaust gas which is directed out of engine 12 through exhaust manifold 42. Exhaust gas flows from exhaust manifold 42 through turbine 44, thereby driving and rotating turbine 44 and compressor 26, and then the exhaust gas exits to the aftertreatment system (not shown).

As engine system 10 operates, controller 100, at step 202, continually determines an actual EGR mass flow rate at module 112 as discussed above. Controller 100 then determines an unadjusted desired EGR mass flow rate value 142 at module 114 as discussed above.

Engine system 10 continues to operate, and controller 100 monitors engine system performance to determine if engine 12 is operating in a steady state condition, at step 206. If engine system 10 is not operating in a steady state, that is, engine system 10 is in a transient condition, controller 100 continues to step 216, described below. When engine system 10 operates in a transient condition the desired EGR mass flow rate is not determined using the adjustment factor 144 (modules 116, 118, or 124) of controller 100. Accordingly, steps 216, 218, and 220 discussed below are performed without taking into account values from the NOx sensor.

If engine system 10 is in a steady state condition, controller 100 determines a desired NOx value 146 with module 116, at step 208. Next, at step 210, controller 100 determines an actual NOx value 148 at module 118. Controller 100 then determines the adjustment factor 144 at module 124 by dividing the desired NOx value 146 by the actual NOx value 148 at step 212. The unadjusted desired EGR mass flow rate value 142 is adjusted by multiplying the unadjusted desired EGR mass flow rate 142 by adjustment factor 144, at step 214. This now-adjusted desired EGR mass flow rate value is then used to determine the desired EGR mass flow rate 128, at step 216. After step 216, engine system 10 determines an EGR command signal 126 based on a difference between the desired EGR mass flow rate value 128 from the actual EGR mass flow rate 140, at step 218. Engine system 10 then actuates EGR valve 62 and/or EGR valve 68 based command signal 126 to control the amount of exhaust recirculated through EGR System 60. Engine system 10 then returns to step 202 to reassess the engine 12 operations, and readjust the EGR system 60 as necessary. By controlling the operations of the engine system 10 according to this method, NOx emissions may be limited to a desired range, while engine system 10 operates effectively in a steady state or transient condition.

The methods disclosed herein provide for a determination of a first EGR command according to a first method during a steady state engine conditions, and a second EGR command according to a second method during a transient engine conditions. The first method is based at least in part on values from a NOx sensor, and the second method is not based on values from a NOx sensor. In so doing, the method recognizes the improved accuracy, but slower response time of NOx sensors, and thus reduces the effect of the NOx sensor during transient conditions when the NOx sensor may be less accurate.

Figure 3:
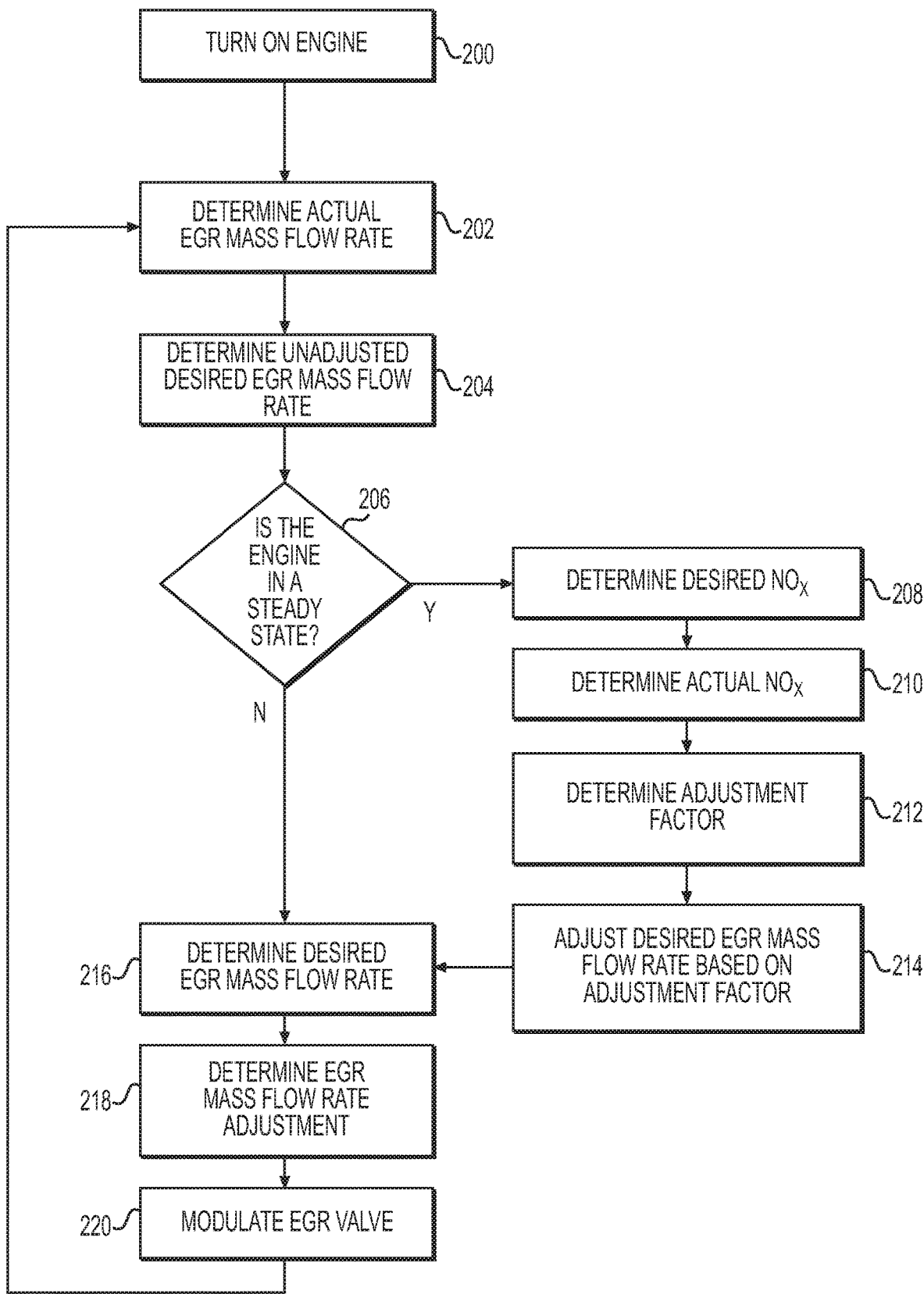
FIG. 3 is a flow chart of an exemplary method of operating the engine system of FIG. 1 using the control strategy of FIG. 2.

Although steps 200 through 220 are depicted and described in a particular order, the principles of the present disclosure are not limited to the order depicted in FIG. 3. For example, step 206 of determining a steady state engine condition could be performed before step 202 and/or 204. Further, while this disclosure identifies various sensors as physical sensors or values as measured values, it is understood that the sensors and measured values discussed herein may alternatively be software (virtual) sensors or derived values based on other sensed parameters. Even further, while certain values disclosed herein are described as being derived via a particular map, look-up table, or equation, it is understood that either may be used, and that the values could be derived by controller 100 or by a different controller or system.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method of controlling an exhaust gas recirculation (EGR) system of an engine system, comprising:
    determining a first EGR command according to a first method during a steady state engine condition;
    determining a second EGR command according to a second method during a transient engine condition, wherein
        the first method is based at least in part on values from a NOx sensor, and the second method is not based on values from a NOx sensor; and
    adjusting an EGR valve of the EGR system based on the first EGR command during the steady state engine condition, and adjusting the EGR valve based on the second EGR command during the transient engine condition.

2. The method of claim 1, wherein the first method includes determining an adjustment factor that is based at least in part on values from the NOx sensor.

3. The method of claim 2, wherein the adjustment factor is further based on values from a humidity sensor.

4. The method of claim 2, wherein the adjustment factor is further based at least in part on a desired NOx value and an actual NOx value, and the NOx sensor is used in determining the actual NOx value.

5. The method of claim 4, wherein the adjustment factor is determined by dividing one of the desired NOx value and the actual NOx value by the other of the desired NOx value and the actual NOx value.

6. The method of claim 4, wherein the actual NOx value is based at least in part on values from the NOx sensor, values from a humidity sensor, values for exhaust mass flow rate, and values for engine brake horsepower.

7. The method of claim 6, wherein the desired NOx value is based at least in part on a value for measured fuel rate and a value for engine speed.

8. The method of claim 1, further including determining an actual EGR mass flow rate based at least in part on one of the following parameters of an EGR flow of the EGR system: temperature, pressure, or pressure differential.

9. A method of controlling an exhaust gas recirculation (EGR) system of an engine system, comprising:
    determining an EGR command based at least in part on a comparison of a value representing an actual EGR mass flow rate and a value representing a desired EGR mass flow rate, wherein
        the value representing the desired EGR flow rate is determined according to a first method during a steady state engine condition, and determined according to a second, different method during a transient engine condition, and
        the first method is based at least in part on values from a NOx sensor, and the second method is not based on values from a NOx sensor.

10. The method of claim 9, wherein the first method includes determining an adjustment factor that is based at least in part on values from the NOx sensor.

11. The method of claim 10, wherein the adjustment factor is further based on values from a humidity sensor.

12. The method of claim 10, wherein the adjustment factor is further based at least in part on a desired NOx value and an actual NOx value, and the NOx sensor is used in determining the actual NOx value.

13. The method of claim 12, wherein the adjustment factor is determined by dividing one of the desired NOx value and the actual NOx value by the other of the desired NOx value and the actual NOx value.

14. The method of claim 12, wherein the actual NOx value is based at least in part on values from the NOx sensor, values from a humidity sensor, values for exhaust mass flow rate, and values for engine brake horsepower.

15. The method of claim 14, wherein the desired NOx value is based at least in part on a value for measured fuel rate and a value for engine speed.

16. The method of claim 9, wherein the actual EGR mass flow rate is determined based at least in part on one of the following measured parameters of an EGR flow of the EGR system: measured temperature, measured pressure, or measured pressure differential.

17. An exhaust gas recirculation (EGR) system of an engine system, comprising:
    a first module configured to determine determining a value representing an actual EGR mass flow rate;
    a second module configured to determine a value representing a desired EGR mass flow rate; and
    at least one EGR valve controlled by the values from the first and second modules;
        wherein input to the second module is based on a value from an adjustment factor module during a steady state engine condition, and
        wherein input to the second module is not based on a value from the adjustment factor module during a transient engine condition.

18. The EGR system of claim 17, wherein the adjustment factor module receives values derived from a NOx sensor.

19. The EGR system of claim 17, wherein the adjustment factor module receives inputs from a desired NOx module and an actual NOx module.

20. The EGR system of claim 17, wherein the first module receives inputs from at least one of an EGR temperature sensors, EGR pressure sensor, or an EGR flow rate sensor.

* * * * *